US007245767B2

(12) United States Patent
Moreno et al.

(10) Patent No.: US 7,245,767 B2
(45) Date of Patent: Jul. 17, 2007

(54) METHOD AND APPARATUS FOR OBJECT IDENTIFICATION, CLASSIFICATION OR VERIFICATION

(75) Inventors: Pedro J. Moreno, Cambridge, MA (US); Purdy Ho, Boston, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 754 days.

(21) Appl. No.: 10/645,084

(22) Filed: Aug. 21, 2003

(65) Prior Publication Data

US 2005/0044053 A1    Feb. 24, 2005

(51) Int. Cl.
*G06K 9/62*    (2006.01)
(52) U.S. Cl. .......................................... 382/224; 706/20
(58) Field of Classification Search ............... 382/157, 382/159, 190, 197, 224, 227, 209; 706/16, 706/20
See application file for complete search history.

(56) References Cited

U.S. PATENT DOCUMENTS

| 6,061,652 A * | 5/2000 | Tsuboka et al. ............ 704/245 |
| 2003/0041041 A1 | 2/2003 | Cristianini .................... 706/12 |
| 2005/0100992 A1 * | 5/2005 | Noble ........................ 435/69.8 |

OTHER PUBLICATIONS

Moreno, et al. "Using the Fisher Kernel Method for Web Audio Classification", IEEE, pp. 2417-2420, 2000.*
Hollmén, et al "A Learning Vector Quantization Algorithm for Probabilistic Models" European Signal Processing Conference, vol. II, pp. 721-724, 2000.*

Bengio, et al "Learning the Decision Function for Speaker Verification", IEEE, pp. 425-428, 2001.*
Gu, Y. and T. Thomas, "A Text-Independent Speaker Verification System Using Support Vector Machines Classifier," Eurospeech 2001 (3 pp.).
Fine, S. et al., "Enhancing GMM Scores Using SVM 'Hints'", Eurospeech 2001 (4 pp.).
Kharroubi, J. et al., "Combining GMM's with Support Vector Machines for Text-Independent Speaker Verification," Eurospeech 2001, (4 pp.).
Lodhi, H. et al., "Text Classification Using String Kernels," Journal of Machine Learning Research 2 (2002) pp. 419-444.

(Continued)

*Primary Examiner*—Daniel Mariam
(74) *Attorney, Agent, or Firm*—Richard P. Lange

(57) ABSTRACT

There is provided a method for classifying, identifying or verifying an object by representing the object by a respective sequence of vectors, modeling the sequence of vectors with a respective generative model such that the object is represented by the generative model, computing the distances between the generative models to form one or many kernel matrices based on the distance metric, and using the kernel matrices to classify, identify or verify the object. There is provided a system for determining a classification of an object having a representation module for representing an object by a respective sequence of vectors, a modeling module for modeling the sequence of vectors with a respective generative model such that the object is represented by the generative model, a distance computing module for calculating the distances between the generative models to form one or many kernel matrices based on the distance metric, and a determination module for classifying, identifying or verifying the object based on the kernel matrices.

16 Claims, 3 Drawing Sheets

OTHER PUBLICATIONS

Jaakkola, T. et al., "Using the Fisher kernel method to detect remote protein homologies," in Proceedings of the International Conference on Intelligent Systems for Molecular Biology, Aug. 1999 (5 pp.).

Jaakkola, T.S. and D. Haussler, "Exploting generative models in discriminative classifiers," in Advances in Neural Information Processing Systems, vol. 11 (1999) 11 pp.

Fine, S. et al., "A Hybrid GMM/SVM Approach to Speaker Identification," In Proceedings of the International Conference on Acoustics, Speech and Signal Processing (ICASSP), 2001 (4 pp.).

Smith, N. et al., Data-Dependent Kernels in SVM Classification of Speech Patterns, Cambridge University Engineering Department Technical Report 387 (Apr. 2001) 56 pp.).

* cited by examiner

METHOD AND APPARATUS FOR OBJECT IDENTIFICATION, CLASSIFICATION OR VERIFICATION

BACKGROUND OF THE INVENTION

Object determination (such as fingerprint recognition, face identification, image/audio classification or speaker verification), is a major problem in many important and relevant fields of business and government. For example, it can be used in biometric authentication to enhance information and homeland security. Or more generally it can be one of the components in rich media indexing systems where the ability to recognize speakers in audio streams is quite useful.

Focusing on speaker identification, there are two major approaches of implementation: text-dependent or text-independent phrases. In the text-dependent approach, the system aligns the incoming and enrolled utterances and compares these utterances based on the speech context. Text-dependent approaches are more suitable to situations where the user is cooperative and where the final goal is verification rather than identification. In the text-independent approach, the system identifies speakers based on the specific acoustic features of the vocal tract instead of the context of the speech, thus no prior knowledge of what is being said is necessary. This identification process is a lot harder and more prone to errors.

Most text-independent speaker identification systems use Gaussian Mixture Models (GMM's) to represent the speech characteristics of the speakers. GMM's are well-known type of generative models. The idea is that each speaker's enrollment utterances are converted to feature vectors. A common feature extraction technique is called Mel-frequency cepstral coefficient (MFCC) See Slaney, M., "Auditory Toolbox, Version 2," *Technical Report, Interval Research Corporation* (1988). Feature vectors from each speaker are trained to fit in a series of Gaussian models. These series of models are weighted by their priors and are combined linearly to form a mixture. Therefore each speaker is represented by a unique GMM. An example of this approach is described in Reynolds, D. A., "Speaker Identification and Verification Using Gaussian Mixture Speaker Models," *Speech Communication*, pp. 91-108 (August 1995). GMM's are generative models since they model the statistical distribution of the feature vectors p(x|speaker) using data from that speaker only. Similarly, GMM's can also be used to model an image (or generally, an object) in any object determination tasks.

As opposed to using generative models such as GMM's, object determination can also be based on discriminative models. The discriminative approach learns how each object compares with all other objects and spends its modeling power in learning what makes objects unique or different from one another. Support Vector Machines (SVM's) (Vapnik, V., *Statistical Learning Theory*, John Wiley and Sons, 1998) are often used in this approach.

SUMMARY OF THE INVENTION

The present invention provides an improved approach to automated/computerized object determination (e.g., speaker/face identification, classification or verification). In particular, the present invention improves the performance of discriminant based methods (such as SVM's) by employing a new kernel that measures similarities across objects and corresponding signals (e.g., images and utterances).

A computer method or system of the present invention determines (i.e., classifies, identifies, verifies or otherwise determines) an object. This is accomplished by representing an object by a respective sequence of vectors; modeling the sequence of vectors with a respective generative model such that the object is represented by the generative model; and computing distances between the generative models to form kernel matrices based on the distance metric for the discriminative classifier to classify, identify or verify the object.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
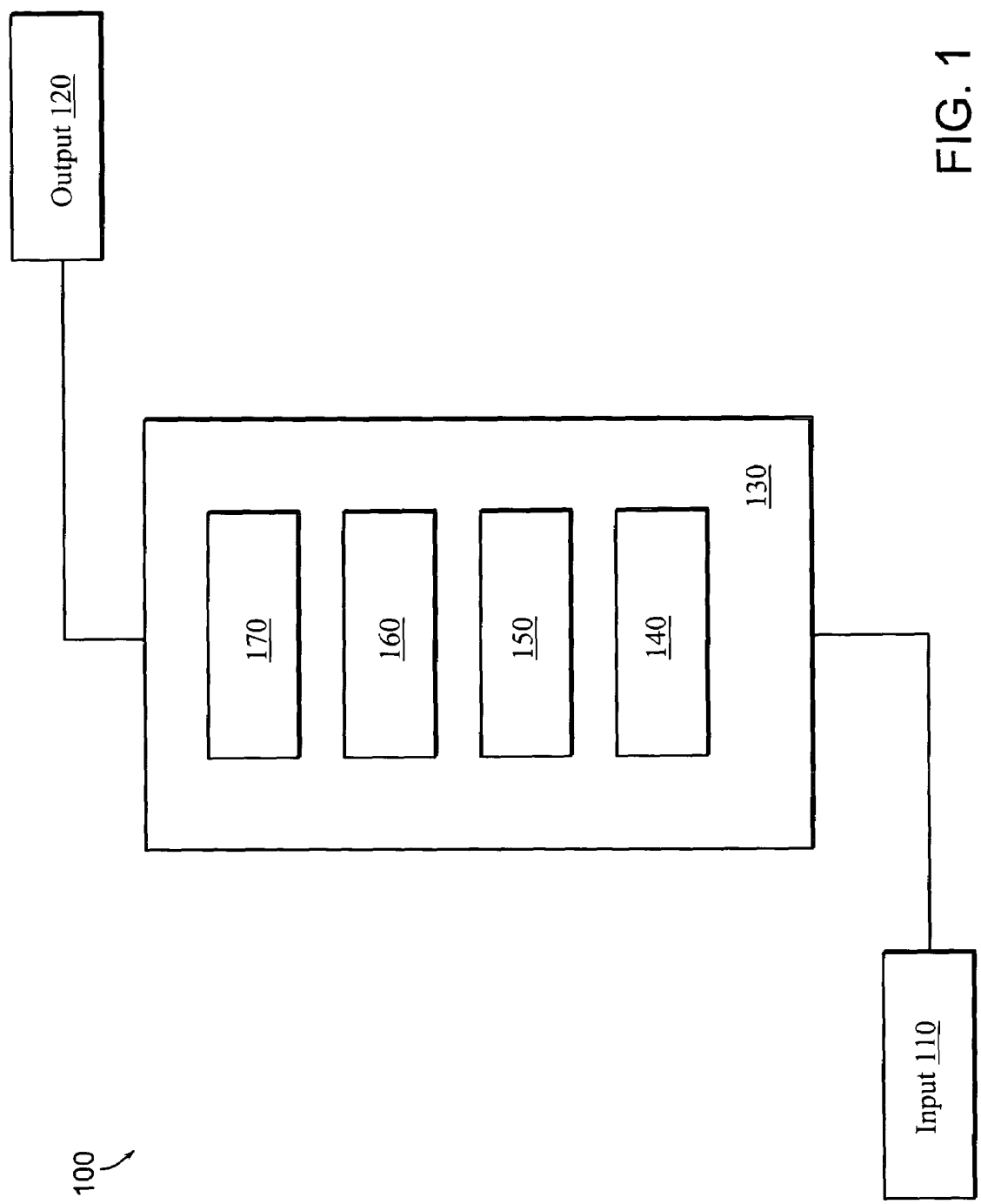
FIG. 1 is a block diagram of an object determination system embodying principles of the present invention.

Generally, as shown in FIG. 1, an object determination system 100 embodying principles of the present invention includes an input device 110, an output device 120, and a processing unit 130 coupled between the input device 110 and output device 120. The input device 110 can be any device that accepts audio signals, speech signals, image data, video data, facial data, electro-cardiology signals, DNA sequences, genetic data and derivatives of any of the signals or data. The output device 120 can be any device (hardware, software or both) that allows for receiving output of the processing unit 130. The processing unit 130 is typically a computer system.

The processing unit 130 has of three modules: a representation module 140, a modeling module 150, a distance computing module 160, and a determination module 170. It should be understood that the three modules can be one module (computer program) or many modules (software routines or programs) in various implementations of the present invention. The representation module 140 is responsive to input received by input device 110. In particular, in response to an object received at input device 110, representation module 140 represents the object by a respective sequence of vectors. In turn, the modeling module 150 models and effectively represents the sequence of vectors with a respective generative model such that the object is represented by the generative model. Toward that end, the modeling module 150 may employ Gaussian Mixture Models, Hidden Markov Models and the like further discussed below.

The distance computing module 160 receives the generative models produced by 150 and computes distances between the generative models in order to determine one or many kernel matrices based on the distance metric for the determination module 170.

The determination module 170 receives the kernel matrices (one or many) produced by the distance computing module 160. The determination module 170 determines, classifies, identifies or verifies the object based on the generative model and outputs the results to the output device 120. In some embodiments, determination module 170 utilizes a discriminative classifier (such as an SVM, Neural Networks, Boosting Classifier, etc.) to determine the object based on the outputs of 160.

Accordingly, the invention method and apparatus enables new or improved object determination by Support Vector Machines (SVM's), Neural Networks, Boosting Classifiers or other discriminative classifiers. The object may be an audio signal, speech signal, image, video data, multimedia data, facial data/image, DNA representations, electro-cardiology signal, genetic data or other similar data/signals, combinations thereof or derivatives. The invention method and apparatus determines the object by making a classification, identification, verification or the like.

As mentioned above, the present invention utilizes a respective generative model for modeling a sequence of vectors that represent a subject object. Preferably, the generative model is a probabilistic distribution model or similar model that employs a probability density function. The probabilistic distribution model includes any one or combination of a diagonal covariance Gaussian Mixture Model, a full covariance Gaussian Mixture Model, a Hidden Markov Model or the like.

The present invention uses the respective generative model to classify, identify, verify or otherwise determine the subject object by calculating a distance from the respective generative model to any other generative models, based on a distance metric. The distance metric may include any of Kullback-Leibler (KL) type distances, such as the symmetric KL distance and the Arithmetic-Harmonic Sphericity distance.

Figure 2:
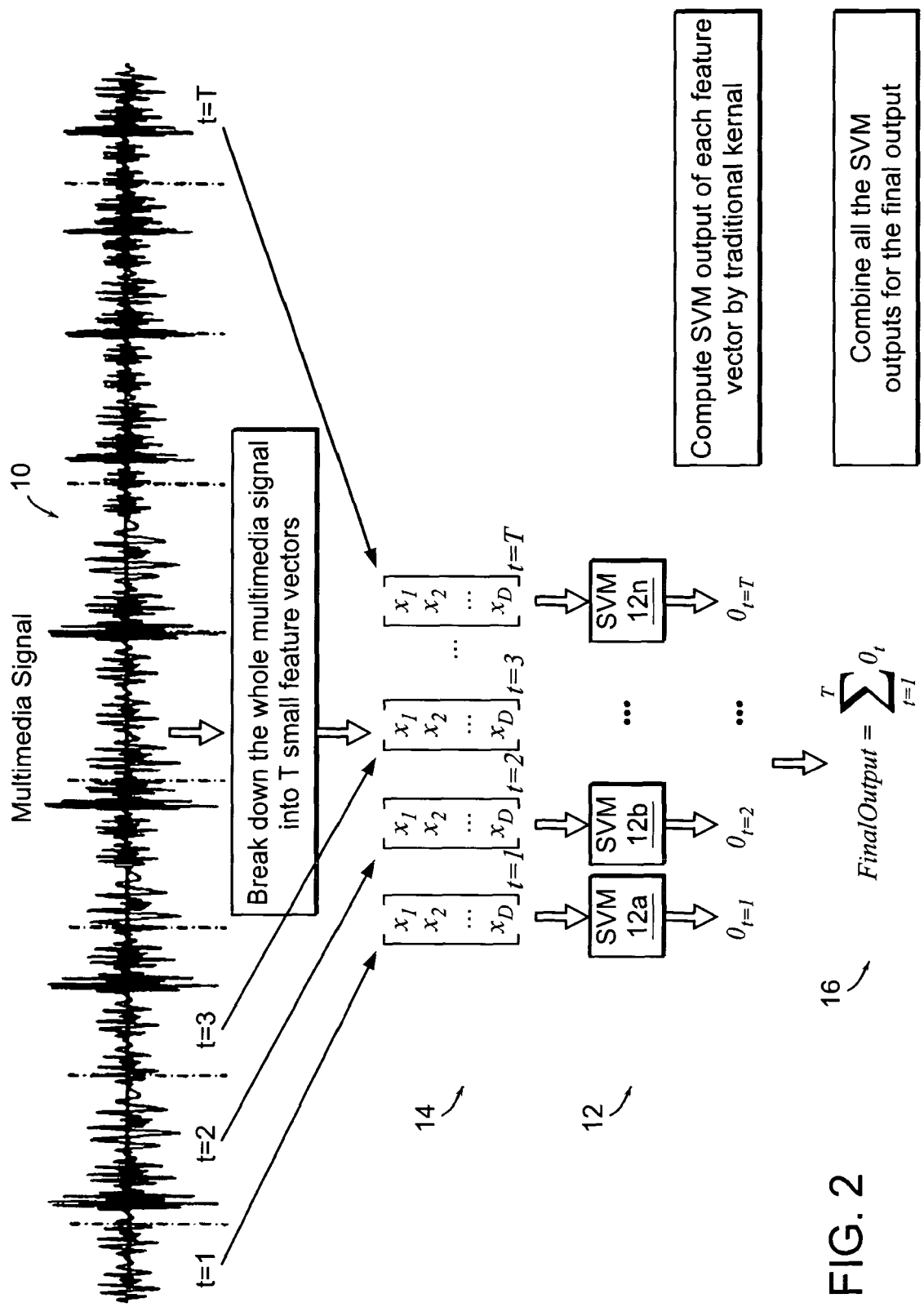
FIG. 2 is a schematic view of prior art discriminative classification.

With reference to FIG. 2, in the typical SVM approach, the key element in designing SVM's is to determine the metric for comparing data points. The metric is represented by the idea of a kernel product, according to Eq. (3). A kernel product allows one to compare two data points in a high dimensional space more efficiently. An SVM represents the distance of all points to all points by a kernel matrix. Each element in a kernel matrix represents the relationship between two data points.

The traditional kernel product functions used in SVM's can be fairly generic. Polynomial, linear, and Gaussian are typical examples. However, these kernel products do not take advantage of the nuances of speech signals or multimedia data sets. Furthermore, these kernels only model distances across single vectors, i.e., very short segments of audio or video, typically less than 25.6 ms, while speech signals are composed of many vectors $X=\{X_1, X_2, \ldots X_n\}$. This means that when one uses SVM's with traditional kernels as illustrated in FIG. 2, the identification of the speaker given a single utterance 10 requires running an SVM classifier 12a,b, ... n on each feature vector $x_i$ (of t=1, t=2, ... t=T as shown at 14) and then combining all classifier 12 outputs $0_t$ (for t=1 through T) as shown at 16. This traditional process is thus prone to errors.

Previous attempts in speaker identification using these kernels are described in Gu, Y. and T. Thomas, "A text-independent speaker verification system using support vector machines classifier," *Eurospeech*, 2001 and Wan, V. and W. Campbell, "Support Vector Machines for Speaker Verification and Identification," *IEEE Proceedings*, 2001. A Fisher transform (Jaakkola, M. D. T. and D. Haussler, "Using the Fisher Kernel Method to Detect Remote Protein Homologies," in *Proceedings of the International Conference on Intelligent Systems for Molecular Biology*, August 1999) approach has been suggested recently as a novel approach to remote protein homology detection as well as in audio classification (Pedro Moreno and Ryan Rifkin, "Using the Fisher Kernel Method for Web Audio Classification", in Proceedings of the International Conference on Acoustics, Speech, and Signal Processing, ICASSP 2000). However as shown in Applicants' experiments ("A New SVM Approach to Speaker Identification and Verification Using Probabilistic Distance Kernels", in Proceedings of Eurospeech 2003), this approach does not work as well as the present invention method and apparatus.

In the present invention, instead of using the traditional kernels, customized kernels (such as in Watkins, C., "Text Classification Using String Kernels," *Advances in Neural Information Processing Systems*, No. 13) are used such that the data characteristics can be better represented. In effect, Applicants take advantage of good generative models that have been proven successful in speaker identification and object retrieval to improve the performance of SVM's. In one embodiment, the customized kernels are based on two distance metrics: Kullback Leibler (KL) divergence and Arithmetic-Harmonic Sphericity (AHS) distance. See Johnson, S. and P. Woodland, "A Method for Direct Audio Search with Applications to Indexing and Retrieval," *ICASSP*, 2000.

In tests of the present invention, Applicants began with the HUB4-96 News Broadcasting corpus (See Stern, R., "Specification of the 1996 HUB4 Broadcast News evaluation," in *DARPA Speech Recognition Workshop*, 1997) and the Corel database ("Corel Stock Photos" from the website elib.cs.berkeley.edu/photos/blobworld/cdlist.html). Focusing on 50 speakers in the HUB corpus, Applicants split the speech data into training and testing sets. The training set contained about 25 utterances (each 3-7 seconds long) from each of the 50 speakers. This made a total of 1198 utterances. The test set contained the rest of the utterances from these 50 speakers. This made 15325 utterances (or about 21 hours of speech). Each of these utterances $X_i$ was first broken up into small frames of 25.6 ms shifted every 10 ms. Each frame is represented by a feature vector of MFCC elements (13 MFCCs, 13 delta MFCCs, and 13 double-delta MFCCs, a total of 39 elements in a feature vector). The utterance is hence represented by a sequence of $n_i$ vectors $X_i=\{X_1, X_2, \ldots X_{ni}\}$.

The customized SVM kernels were trained on two different types of metrics, the KL divergence and the AHS distance. In the KL-Divergence metric, each utterance is first modeled by a small GMM. The system typically learns from 8 to 32 Gaussians per utterance using the EM (Expectation Maximization) algorithm. Thus 1198 GMM's are learned for training and 15325 for testing, one per utterance. Then the KL divergences between each of these GMM's were computed according to Eq.(4), this formed a 1198×1198 matrix for the training set and a 15325×1198 matrix for the test set. The two kernel matrices, one for training and one for testing, were then adequately transformed according to Eq.(5) to insure positive definiteness.

In the AHS distance metric, each utterance is first modeled by a single Gaussian with a full covariance. Thus 1198 single full covariance Gaussians are learned for training and 15325 for testing, one per utterance. Then the AHS distances between each of these single full covariance Gaussians were computed according to Eq.(6), this formed a 1198×1198 matrix for the training set and a 15325×1198 matrix for the test set. As in the previous case, the two kernel matrices were then adequately transformed according to Eq.(5) to insure positive definiteness.

In the tests for image classification, the COREL database was found to contain a variety of objects such as landscape, vehicles, plants and animals. To make the task more challenging, Applicants picked eight classes of highly confusable objects: Apes, ArabianHorses, Butterflies, Dogs, Owls, PolarBears, Reptiles and RhinosHippos. There were 100 images per class—66 for training and 34 for testing; thus a total of 528 training images and 272 testing images were used. All images are 353×225 pixel 24-bit RGB-color JPEG's. To extract feature vectors $X_i$, Applicants followed standard practice in image processing. For each of the three color channels, the image was scanned by an 8×8 window shifted every 4 pixels. The 192 pixels under each window were converted into a 192-dimensional Discrete Cosine Transform (DCT) feature vector. After that, only the 64 low frequency elements were used since they captured most of the image characteristics.

The image experiments trained and tested four different types of classifiers: Baseline GMM, SVM using Fisher kernel, and SVM using the invention KL divergence based kernels.

When training and testing the invention GMM/KL Divergence based kernels, a sequence of feature vectors, $\{x_1, x_2, \ldots, x_m\}$ from each image X was modeled by a single GMM of diagonal covariances. Then the KL divergences between each of these GMM's were computed according to Eq. (4) and transformed according to Eq. (5) to ensure positive definiteness. This resulted in kernel matrices for training and testing that could be fed directly into an SVM classifier. Since all the SVM experiments were multiclass experiments, Applicants used the 1-vs-all training approach. The class with the largest positive score was designated as the winner class. For the experiments in which the object PDF (probability density function) was a single full covariance Gaussian, Applicants followed a similar procedure. The AHS distances between each pair of PDF's were computed according to Eq. (6) and transformed according to Eq. (5) to ensure positive definiteness.

In the Fisher kernel experiments, Applicants computed the Fisher score vector $U_x$ according to Eq.(1) for each training and testing image with Θ parameter based on the prior probabilities of each mixture Gaussian. The underlying generative model was a single generic GMM of all training data.

The results using the KL divergence based kernels in both multimedia data types showed much promise. In the case of the HUB experiments, methods suggested by the Applicants perform well in both speaker verification and identification tasks ("A New SVM Approach to Speaker Identification and Verification Using Probabilistic Distance Kernels", in Proceedings of Eurospeech 2003). In the results of the image classification experiments with the COREL database, both KL based SVM kernels of the present invention outperformed the Fisher SVM; the invention GMM/KL kernel even outperformed the baseline GMM classifier ("A Kullback-Leibler Divergence Based Kernel for SVM Classification in Multimedia Applications", submitted to Neural Information Processing Systems, NIPS 2003).

Figure 3:
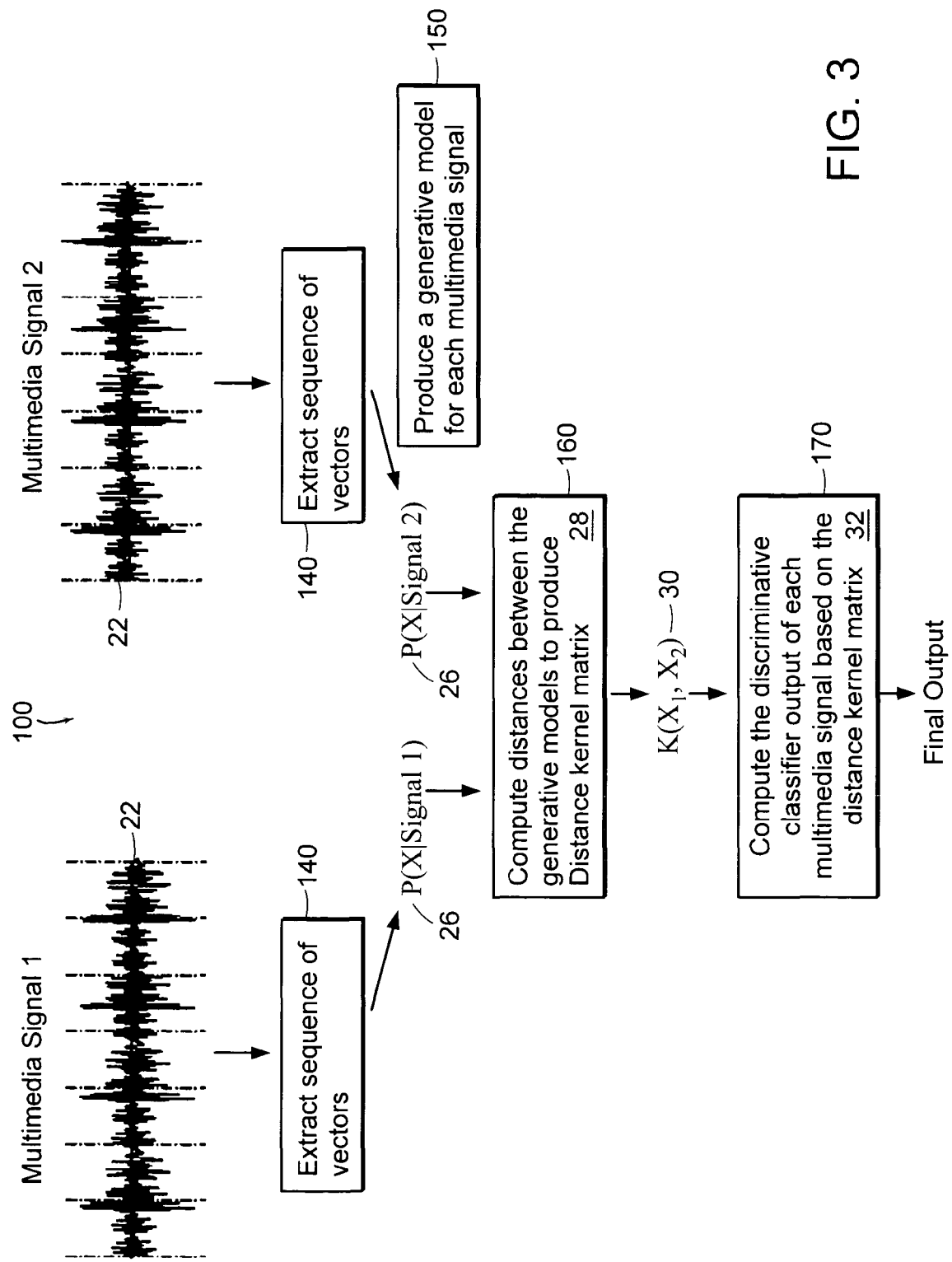
FIG. 3 is a schematic view of the operation of the invention system of FIG. 1.

FIG. 3 illustrates the operation of the invention method and apparatus 100 as performed in the test examples above and in general. Subject source objects are received at 22 and may include audio signals, speech signals, video signals, image data, multimedia data and/or the like. In some embodiments, the objects are biometric signals, including but not limited to audio data, image data, facial data, video sequences, DNA representations, electro-cardiology signals and the like, and combinations or derivatives of such biometric signals. A vector representation module (i.e., representation module 140 of FIG. 1) generates a respective sequence X of vectors for representing the received source data/objects 22.

More specifically, the vector representation module 140 parses the received source data/object 22 into small (e.g. 23 ms) frames or windows (for example 10 pixels×10 pixels) shifted by a certain amount (e.g., every 10 ms, every 4 pixels, etc.). For each frame or window, the representation module 140 produces a feature vector of MFCC or DCT or other kinds of feature extractions, as will be made clearer in the later discussion of equations employed. A sequence X of feature vectors results and is output by the vector representation module 140 as the representation of the subject source data/object 22.

The modeling module 150 receives the vector representation output X from the vector representation module 140. The modeling module 150 produces a respective generative model P(X) for representing the subject source data/object 22. Preferably the generative model 26 is a probabilistic distribution model or any similar model that employs a probability density function.

In one embodiment, the modeling module 150 utilizes a Gaussian Mixture Model (GMM) for modeling and representing the subject source data/object 22. Effectively a respective GMM represents the corresponding sequence of feature vectors representing the subject source data/object 22. Various types and combinations of GMM's (diagonal covariance, full covariance, etc.), Hidden Markov Models and the like are suitable.

Next a distance circuit 28 of the distance computing module 160 computes the distance from the respective generative model 26 to any other generative model based on a distance metric. In one embodiment, the KL divergence and AHS distances are used. Preferably the distance metric follows the properties of (a) distance of an object to itself is zero, and b) distance of an object to any other object is larger than or equal to zero. From the computed distances, distance circuit 28 produces or otherwise forms a distance kernel matrix 30. The invention system uses the distance kernel matrix 30 as input to the determination module 170 in which a discriminative classifier such as an SVM 32, neural network, boosting classifier and the like is used to output a classification, identification, verification or similar determination of the subject source data/object 22. In one embodiment, the SVM's are used in the determination module 170.

Computations and algorithms employed in the foregoing operation of the invention method and apparatus 100 are described next.

For any given sequence of vectors defining a multimedia (audio signal, image data, video, etc.) object $X=\{X_1, X_2, \ldots, X_m\}$ and assuming that each vector in the sequence is independent and identically distributed, Applicants define the likelihood of the ensemble being generated by p(x|Θ) as $P(X|\Theta) = \prod_{i=1}^{m} p(x_i|\Theta)$.

Fisher Kernels

The Fisher score maps each individual sequence $\{X_1, \ldots, X_n\}$, composed of a different number of feature vectors, into a single vector in the gradient log-likelihood space.

This new feature vector, the Fisher score, is defined as $$U_x = \nabla_\Theta \log(P(X|\Theta)) \qquad (1)$$

Each component of $U_x$ is a derivative of the log-likelihood of the vector sequence X with respect to a particular parameter of the generative model. The parameters Θ of the generative model are chosen from either the prior probabilities, the mean vector or the diagonal covariance matrix of each individual Gaussian in the mixture model. For example, if the mean vectors are used as the model parameters $\Theta$, i.e., for $\Theta=\mu_k$ out of K possible mixtures, then the Fisher score is $$\nabla_{\mu_k} \log(P(X \mid \mu_k)) = \sum_{i=1}^{m} P(k \mid x_i) \sum_{k}^{-1} (x_i - \mu_k) \quad (2)$$

where $P(k|x_i)$ represents the a posteriori probability of mixture k given the observed feature vector $x_i$. Effectively Applicants transform each multimedia object (audio or image) X of variable length into a single vector $U_x$ of fixed dimension.

Kullback-Leibler Divergence Based Kernels

Start with a statistical model $p(x|\Theta_i)$ of the data, i.e., estimate the parameters $\Theta_i$ of a generic probability density function (PDF) for each multimedia object (utterance or image) $X_i=\{X_1,X_2,\ldots,X_m\}$. In one embodiment, applicants use diagonal Gaussian mixture models and single full covariance Gaussian models. In the first case, the parameters $\Theta_i$ are priors, mean vectors and diagonal covariance matrices, while in the second case the parameters $\Theta_i$ are the mean vector and full covariance matrix.

Once the PDF $p(x|\Theta_i)$ has been estimated for each training and testing multimedia object, replace the kernel computation in the original sequence space by a kernel computation in the PDF space:

$$K(X_i,X_j) \Rightarrow K(p(x|\Theta_i),p(x|\Theta_j)) \quad (3)$$

To compute the PDF parameters $\Theta_i$ for a given object $X_i$, Applicants use a maximum likelihood approach. The Expectation Maximization algorithm or its derivatives can be used for initialization. Effectively Applicants propose to map the input space $X_i$ to a new feature space $\Theta_i$.

Notice that if the number of vectors in the $X_i$ multimedia sequence is small and there is not enough data to accurately estimate $\Theta_i$, one can use regularization and/or adaptation methods to improve the performance. For example, starting from a generic PDF and adapting its parameters $\Theta_i$ to the current object is also possible and suitable.

The next step is to define the kernel distance in this new feature space of the present invention. Because of the statistical nature of the feature space, a natural choice for a distance metric is one that compares PDF's. From the standard statistical literature, there are several possible choices, however, here Applicants only report results on the symmetric Kullback-Leibler (KL) divergence $$D(p(x\mid\Theta_i), p(x\mid\Theta_j)) = \quad (4)$$
$$\int_{-\infty}^{\infty} p(x\mid\Theta_i)\log\left(\frac{p(x\mid\Theta_i)}{p(x\mid\Theta_j)}\right)dx + \int_{-\infty}^{\infty} p(x\mid\Theta_j)\log\left(\frac{p(x\mid\Theta_j)}{p(x\mid\Theta_i)}\right)dx$$

Because a matrix of kernel distances directly based on symmetric KL divergence does not satisfy the Mercer conditions, i.e., it is not a positive definite matrix, the invention system 100 needs a further step to generate a valid kernel. Among many possibilities, Applicants exponentiate the symmetric KL divergence, scale and shift (A and B factors below) it for numerical stability reasons $$K(X_i,X_j) \Rightarrow K(p(x|\Theta_i),p(x|\Theta_j)) \Rightarrow e^{-A\,D(p(x|\Theta_i),p(x|\Theta_j))+B} \quad (5)$$

In the case of Gaussian mixture models, the computation of the KL divergence is not direct. In fact, there is no analytical solution to Eq. (4) and Applicants resort to Monte Carlo methods or numerical approximations. In the case of single full covariance models, the K-L divergence has an analytical solution $$D(p(x|\Theta_i),p(x|\Theta_j))=tr(\Sigma_i\Sigma_j^{-1})+tr(\Sigma_j\Sigma_i^{-1})-2S+tr((\Sigma_i^{-1}+\Sigma_j^{-1})(\mu_i-\mu_j)(\mu_i-\mu_j)^T) \quad (6)$$

where S is the dimensionality of the original feature data x, $\Sigma$ is the covariance of the original feature data x, $\mu$ is the mean of the original feature data x, tr is the trace of a matrix. This distance is similar to the Arithmetic harmonic spericity (AHS) distance known in the speaker identification and verification research community (see Bimbot, F et al., "Second-Order Statistical Measures for Text-Independent Speaker Identification," *Speech Communication*, Vol. 17, pp. 177-192, 1995).

Notice that there are significant differences between the invention KL divergence based kernel and the Fisher kernel method of prior art. The Fisher kernel relies on a single generic PDF based on all training data. In Applicants' approach, there is no underlying generative model to represent all data. The present invention does not use a single PDF (even if it encodes a latent variable indicative of class membership) as a way to map the multimedia, audio or image object from the original feature vector space to a gradient log-likelihood vector space. Instead each individual object (consisting of a sequence of feature vectors) is modeled by its unique PDF. This represents a more localized version of the Fisher kernel underlying the generative model. Effectively the modeling power is spent where it matters most, on each of the individual objects in the training and testing sets. Interestingly, the object PDF does not have to be extremely complex. As mentioned in the experimental test section, a single full covariance Gaussian model produces extremely good results. Also, in Applicants' approach there is not a true intermediate space unlike the gradient log-likelihood space used in the Fisher kernel. In the present invention, subject objects are transformed directly into PDF's.

While this invention has been particularly shown and described with references to preferred embodiments thereof, it will be understood by those skilled in the art that various changes in form and details may be made therein without departing from the scope of the invention encompassed by the appended claims.

This technology can be applied to multiple domains, for example, multimedia indexing, biometric authentication, and tracking of speakers (when does a speaker talk in a stream of audio). The invention techniques, methods and systems can be combined with face recognition and/or other biometric authentication technology to recognize individuals more accurately and it can potentially be used in telephony.

Further the source data or object signals discussed above may be derivatives or combinations of signals. For example, normalized data or preprocessed signals may be used.

What is claimed is:

1. A method for classifying, identifying or verifying an object comprising computer implemented steps of:
   representing an object by a respective sequence of vectors;
   modeling the sequence of vectors with a respective generative model such that the object is represented by the generative model; and using the generative model, classifying, identifying or verifying the object, wherein the step of using the generative model further includes the steps of: calculating a distance from the respective generative model to any other generative models based on a distance metric, wherein the distance metric includes any one of Kullback-Leibler type distances and Arithmetic-Harmonic Sphericity distance; and using the calculated distance to classify, identify or verify the object.

2. The method of claim 1 wherein the distance metric follows the properties of:
   (a) distance of an object to itself is zero, and
   (b) distance of an object to any other object is larger than or equal to zero.

3. The method of claim 1, wherein the object is any one or combination of audio signals, speech signals, image data, video data, multimedia, facial data, DNA representations, electro-cardiology signals and genetic data and derivatives of any said signals or data.

4. The method of claim 1, wherein the respective generative model is a probabilistic distribution model.

5. The method of claim 4, wherein the probabilistic distribution model employs a probability density function.

6. The method of claim 4 wherein the probabilistic distribution model includes any one or combination of a diagonal covariance Gaussian Mixture Model, a full covariance Gaussian Mixture Model, and a Hidden Markov Model.

7. The method of claim 1, wherein at least the step of classifying is supported by one of a Support Vector Machine, a Neural Network, a Boosting Classifier or other discriminative classifier.

8. An object determination system, comprising:
   a representation module for representing an object by a respective sequence of vectors;
   a modeling module for effectively replacing the sequence of vectors with a respective generative model such that the object is represented by the generative model; and
   a determination module for classifying, identifying or verifying the object based on the generative model, wherein the determination module further calculates a distance from the respective generative model to any other generative model based on a distance metric, wherein the distance includes at least one of Kullback-Leibler divergence and Arithmetic-Harmonic Sphericity distance, and uses the calculated distance to classify, identify or verify the object.

9. The object determination system of claim 8 wherein the distance metric follows the properties of:
   a) distance of an object to itself is zero, and
   b) distance of an object to any other object is larger than or equal to zero.

10. The object determination system of claim 8, wherein the object is any one or combination of audio signals, speech signals, image data, video data, multimedia, facial data, electro-cardiology signals, DNA sequences, and genetic data and derivatives of any said signals or data.

11. The object determination system of claim 8, wherein the respective generative model is a probabilistic distribution model or utilizes a probability density function.

12. The object determination system of claim 11, wherein the probabilistic distribution model includes any of a diagonal covariance Gaussian Mixture Model, a full covariance Gaussian Mixture Model, and a Hidden Markov Model.

13. The object determination system of claim 8, wherein the object determination system includes any of a Support Vector Machine, a Neural Network, a Boosting Classifier or other discriminative classifier.

14. An object determination system, comprising:
   means for representing an object by a respective sequence of vectors;
   means for modeling the sequence of vectors with a respective generative model; and
   means for determining class, identity or veracity of the object based on the generative model, wherein the means for determining calculates a distance from the respective generative model to any other generative model based on a distance metric, wherein the distance metric includes any one of Kullback-Leibler type distances and Arithmetic-Harmonic Sphericity distance, and uses the calculated distance to classify, identify or verify the object.

15. An object determination system as claimed in claim 14 wherein the respective generative model is a probabilistic distribution model or utilizes a probability density function.

16. An object determination system as claimed in claim 14 wherein:
   the object is any one or combination of audio signals, speech signals, image data, video data, multimedia, facial data, electro-cardiology signals, DNA sequences, and genetic data and derivatives of any said signals or data.

* * * * *